United States Patent [19]

Sindermann et al.

[11] Patent Number: 5,058,390

[45] Date of Patent: Oct. 22, 1991

[54] AIRCRAFT VAPOR CYCLE COOLING SYSTEM WITH TWO SPEED CONTROL OF A CONDENSER FAN AND METHOD OF OPERATION

[75] Inventors: Frederick L. Sindermann; Dam C. Nguyen, both of Rockford, Ill.

[73] Assignee: Sundstrand Corporation, Rockford, Ill.

[21] Appl. No.: 528,613

[22] Filed: May 25, 1990

[51] Int. Cl.⁵ .................... F25B 39/04; F25D 17/00
[52] U.S. Cl. .......................... 62/181; 62/184; 62/226; 62/228.4
[58] Field of Search ......... 62/181, 183, 184, DIG. 17, 62/208, 209, 428, 429, 203, 226, 228.4; 165/40

[56] References Cited

U.S. PATENT DOCUMENTS

| | | | |
|---|---|---|---|
| 3,465,538 | 4/1969 | Wunder | 62/184 |
| 4,463,575 | 8/1984 | McCord | 62/184 |
| 4,590,772 | 5/1986 | Nose et al. | 62/184 |
| 4,658,595 | 4/1987 | Shimada et al. | 62/179 |
| 4,966,006 | 10/1990 | Thuesen et al. | 62/183 X |
| 4,974,420 | 12/1990 | Kramer | 62/181 X |

OTHER PUBLICATIONS

"A New Technology in Energy-Efficient Electrically Driven Aircraft Environmental Control Systems", by William W. Cloud et al., pp. 1696-1702 ©American Chemical Society.

*Primary Examiner*—Harry B. Tanner
*Attorney, Agent, or Firm*—Antonelli, Terry, Stout & Kraus

[57] ABSTRACT

A vapor cycle cooling system (10) in accordance with the invention includes a compressor (12) for compressing refrigerant vapor; a condenser (14) receiving compressed refrigerant vapor from the compressor; a fan (18) having at least two controllable speeds for blowing a fluid (16) in contact with the condenser to remove heat from the compressed refrigerant at the condenser to cause the refrigerant to liquify, the speeds of the fan being controllable by a control signal; an expansion valve (22) receiving liquid refrigerant from the condenser which expands the liquid refrigerant; an evaporator (24) receiving the expanded refrigerant which exchanges heat with a fluid stream (26) coupled to a heat load (28); and a controller (20) for generating the control signal, responsive to a sensed evaporator temperature, a sensed ambient temperature and a sensed altitude which controls two speeds of the fan as a function of the sensed temperatures and altitude by generating the control signal.

40 Claims, 2 Drawing Sheets

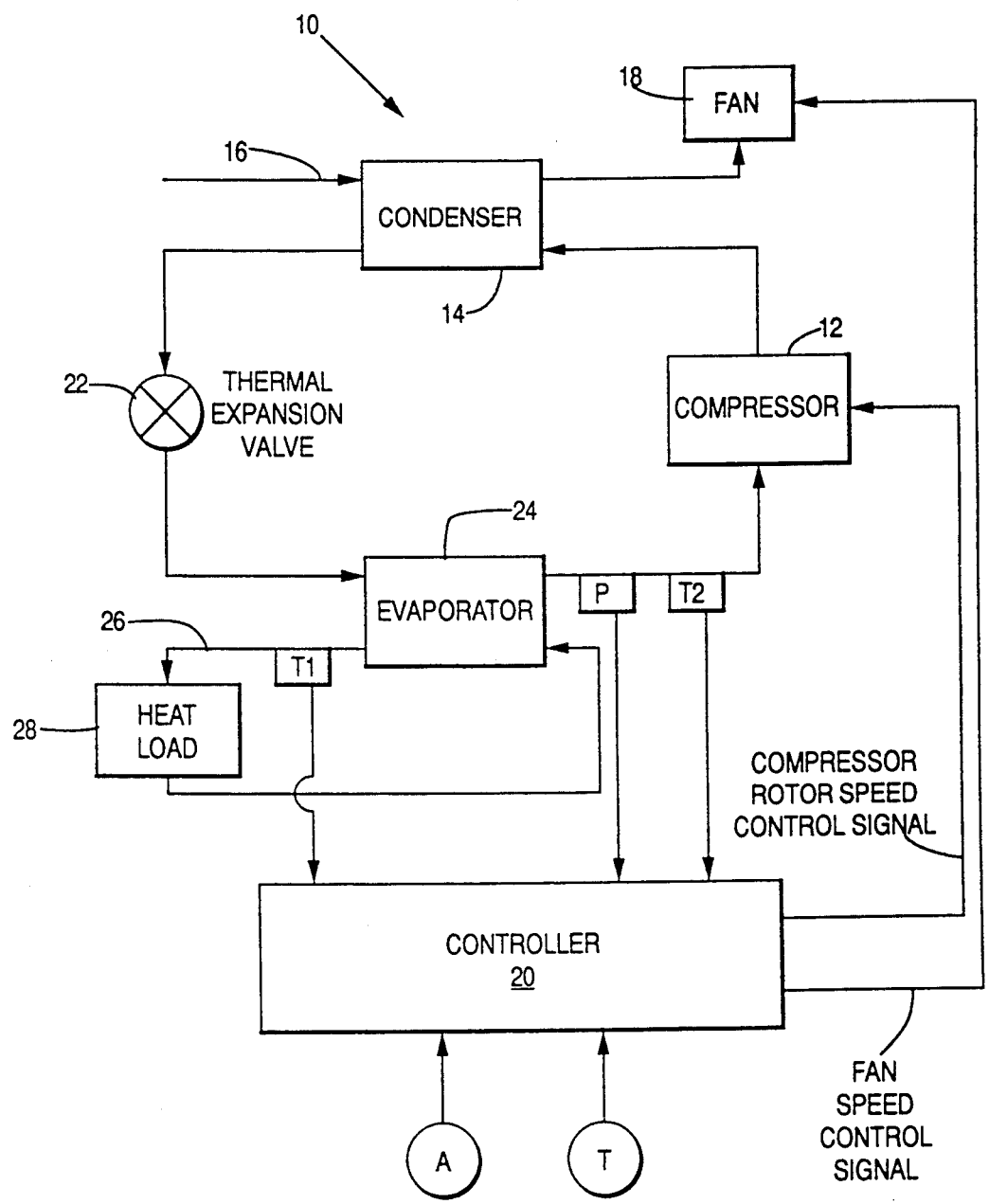

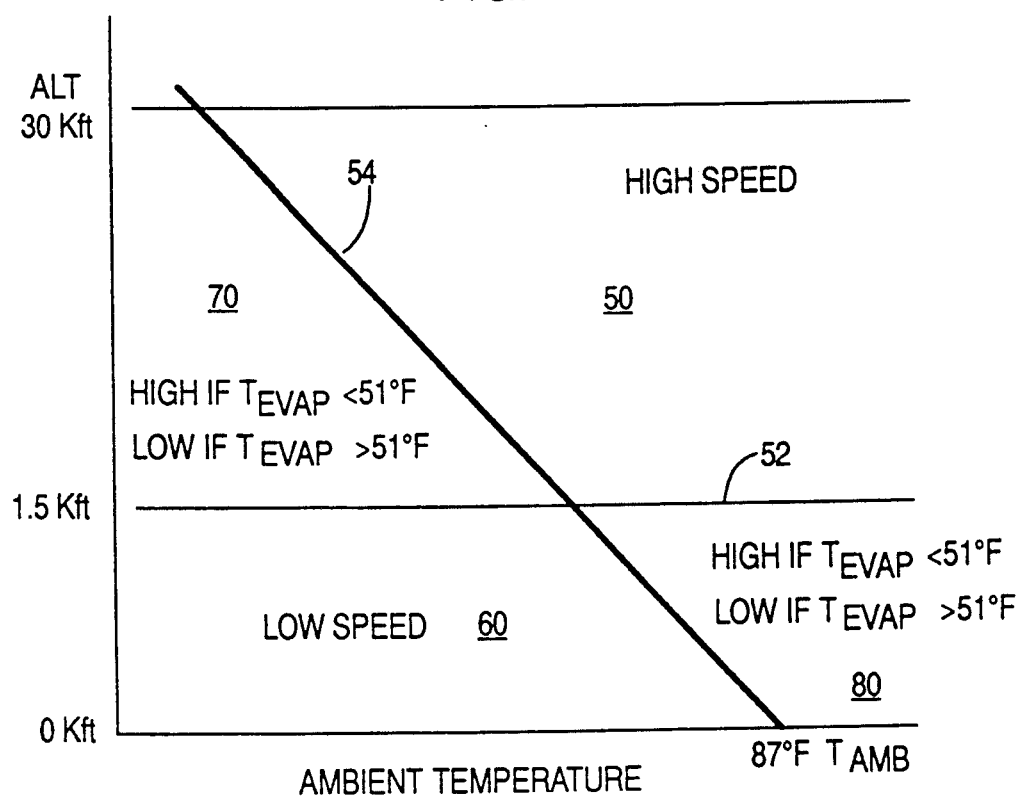

AIRCRAFT VAPOR CYCLE COOLING SYSTEM WITH TWO SPEED CONTROL OF A CONDENSER FAN AND METHOD OF OPERATION

DESCRIPTION

1. Technical Field

The present invention relates to vapor cycle cooling systems used for airframe applications.

2. Background Art

U.S. Pat. No. 3,465,538 discloses a control for condenser fan in a vapor cycle cooling system. The condenser fan is driven by a hydraulic motor with a speed which is changed as a function of load requirements or changing ambient temperature or both. The disclosed system varies the speed of operation of the fan continuously as a function of changing pressure in the refrigerant flowing in the refrigeration system.

Modern aircraft require vapor cycle cooling systems for cooling of the pilots' cockpit area, any passenger compartments and numerous electrical and mechanical heat generating components on the aircraft. High power electronics are especially susceptible to malfunction if adequate cooling is not provided by an on-board vapor cycle cooling system.

Reduction of weight in the design of an airframe is of great importance. Minimizing the weight of components within an airframe vapor cycle cooling system is important in the overall operational efficiency of the airframe. The benefits of increased functionality provided by sophisticated electronics, which result in additional weight and generation of heat, must be evaluated with regard to their effect on the overall operational efficiency of a design of an airframe. The most sophisticated electronics providing the highest degree of control are not necessarily the desired choice in an airframe design when weight, size and expense are considered.

A paper describing the use of a variable speed condenser fan is ACS Paper No. 869390 entitled "A New Technology in Energy-Efficient Electrically Driven Aircraft Environmental Control Systems" presented at the 21st IECEC Conference, Aug. 25-29, 1986. This paper describes the use of non-azeotropic refrigerants for vapor cycle cooling systems used for airframe applications. The paper discloses a microprocessor control for a variable speed condenser fan and variable speed compressor rotor drive. The speed control for the condenser fan is not disclosed as a two-speed control. The method of control of the speed of the condenser fan and compressor rotor are not discussed.

DISCLOSURE OF INVENTION

The present invention is a vapor cycle cooling system and a method of operating a vapor cycle cooling system which controls condenser fan speed and compressor rotor speed to minimize the total power drawn for every operating condition of the system. Studies of the Assignee show that the consumption of energy in an airframe vapor cycle cooling system principally occurs as a consequence of the power drawn by the compressor and the fan for the condenser. The utilization of a two-speed condenser fan control provides significant energy savings when compared with a constant speed condenser fan control. Furthermore, the utilization of a two-speed condenser fan control with integral control of the rotational velocity of a rotor of the compressor to maintain operation of the evaporator within a predetermined superheat range provides a highly efficient airframe vapor cycle cooling system which minimizes energy consumption while not requiring sophisticated electronics to control a continuously variable speed condenser fan. With a two-speed condenser fan, the electronic control of the motor driving the condenser fan is greatly simplified in comparison to a continuously variable speed condenser fan while providing many of the benefits of a variable speed condenser fan when compared with a single speed condenser fan.

The benefits of a two-speed fan control of a condenser fan for a vapor cycle cooling system used in an airframe application are a reduction in size and weight from the size and weight required for a continuously variable speed fan control, a reduction in cost from the cost of a continuously variable speed fan control and variable speed motor and a simpler and more reliable condenser fan control and motor as a consequence of the simplification of the control and motor windings.

A vapor cycle cooling system in accordance with the invention includes a compressor for compressing refrigerant vapor; a condenser receiving compressed refrigerant vapor from the compressor; a fan having at least two controllable speeds for blowing a fluid in contact with the condenser to remove heat from the compressed refrigerant at the condenser to cause the refrigerant to liquify, the speeds of the fan being controlled by an applied control signal; an expansion valve receiving liquid refrigerant from the condenser which expands the liquid refrigerant; an evaporator receiving the expanded refrigerant which exchanges heat with a fluid stream coupled to a heat load; a controller for generating the control signal, responsive to a sensed evaporator temperature, a sensed ambient temperature and a sensed altitude which controls the two-speeds of the fan as a function of the sensed temperatures and altitude. The controller causes the fan to operate at a lower and a higher speed in accordance with a set of conditions.

The set of conditions are as follows. The fan is caused to operate by the controller at the lower speed independent of evaporator temperature when the sensed altitude is below a set level and the sensed ambient temperature is not greater than a calculated control temperature for the sensed altitude which varies as a function of altitude which preferably is a linear function of altitude. The fan is caused to operate by the controller at the higher speed independent of evaporator temperature when the sensed altitude is above a set level and the sensed ambient temperature is not less than a calculated control temperature for the sensed altitude which varies as a function of altitude which preferably is a linear function of altitude. The fan is caused to operate by the controller at the higher speed when the sensed altitude is above a set level and a sensed evaporator temperature is less than a set temperature and the sensed ambient temperature is not greater than a calculated control temperature for the sensed altitude which varies as a function of altitude which preferably is a linear function of altitude; and the fan is caused to operate by the controller at the lower speed when the sensed altitude is above a set level and a sensed evaporator temperature is greater than a set temperature and the sensed ambient temperature is not greater than a calculated control temperature for the sensed altitude which varies as a function of altitude which preferably is a linear function of altitude. The fan is caused to operate by the controller at the higher speed when the sensed altitude is below a set level and a sensed evaporator temperature is less than a set temperature and the sensed ambient temperature is not less than a calculated control temperature for the sensed altitude which varies as a function of altitude; and the fan is caused to operate by the controller at the lower speed when the sensed altitude is below a set level and a sensed evaporator temperature is greater than a set temperature and the sensed ambient temperature is not less than a calculated control temperature for the sensed altitude which varies as a function of altitude.

Further in accordance with the invention, the controller controls a rotational velocity of a compressor rotor, in response to the sensed inlet compressor temperature and a sensed compressor inlet pressure to provide operation of the vapor cycle cooling system within a set superheat range.

A method of operating a vapor cycle cooling system having a fan with at least two controllable speeds for blowing a fluid in contact with a condenser to remove heat from compressed refrigerant within the condenser to cause the refrigerant to liquify in accordance with the invention includes sensing an evaporator temperature; sensing an ambient temperature; sensing an altitude at which the vapor cycle cooling system is operating; and controlling the two speeds of the fan as a function of the sensed temperatures and altitude. The rotational velocity of a compressor rotor is controlled as a function of a sensed inlet compressor temperature and a sensed inlet compressor pressure of refrigerant flowing to an inlet of the compressor to provide operation of the vapor cooling system within a set superheat range.

BRIEF DESCRIPTION OF DRAWINGS

FIG. 1 illustrates a block diagram of a vapor cycle cooling system in accordance with the present invention.

FIG. 2 illustrates a set of conditions under which the speeds of a condenser fan of the system of FIG. 1 are controlled.

BEST MODE FOR CARRYING OUT THE INVENTION

FIG. 1 illustrates an airframe vapor cycle cooling system 10 in accordance with the present invention. A compressor 12 is provided for compressing refrigerant vapor in accordance with conventional operation of a vapor cycle cooling system. The refrigerant, while not limited thereto, may be a non-azeotropic binary refrigeration fluid of the type disclosed in commonly assigned U.S. Pat. Nos. 4,598,556 and 4,809,521 and may be a mixture such as a 50% mole fraction of R-11 and R-12 refrigeration fluids. The compressor 12 may be a centrifugal compressor having a pair of stages with the stages being rotatably supported by hydrodynamic radial and hydrodynamic thrust bearings which are lubricated with an oiless refrigeration fluid of the aforementioned non-azeotropic binary refrigeration fluid type. The compressor includes a motor and speed control for driving the compressor at high rotational velocities up to 70,000 rpm. The motor and speed control may be of the type described in U.S. patent application Ser. Nos. 319,719, 319,727 and 320,224 which are assigned to the Assignee of the present invention.

A condenser 14 receives compressed refrigerant vapor from the compressor 12. A fluid stream 16, which in a preferred application is air, is circulated in thermal contact with the condenser 14 in a counterflow direction to the flow of refrigerant to the condenser under the control of a condenser fan 18 having at least two controllable speeds for blowing the fluid 16 in contact with the condenser to remove heat from the compressed refrigerant at the condenser to cause the refrigerant to liquify with the speeds of the fan being controlled to operate at a lower and a higher speed by a FAN SPEED CONTROL SIGNAL which may assume first level to cause the lower speed of rotation and a second level to cause the higher speed of operation. The COMPRESSOR ROTOR SPEED CONTROL SIGNAL applied to the compressor 12 and FAN SPEED CONTROL SIGNAL applied to the fan 18 are generated by controller 20 as described below.

An expansion valve 22 receives liquid refrigerant from the condenser which expands the liquid refrigerant and an evaporator 24 receives the expanded refrigerant which exchanges heat with a fluid 26 which has picked up heat by thermal contact with a heat load 28 circulating in a counterflow direction to the direction of refrigerant flowing through the evaporator. The compressor, condenser, expansion valve and evaporator operate as a vapor cycle cooling system in a conventional manner.

The controller 20 is responsive to a plurality of sensors. A sensor with the letter "P" contained inside of a square box senses the pressure at the output of the evaporator 24. A sensor with the letter "A" contained inside a circle senses the altitude of the airframe vapor cycle cooling system during operation. A sensor with the letter "T1" in a square box in contact with the air stream from evaporator 24, senses the temperature of the air stream from the evaporator. A sensor with the letter "T" contained inside a circle, senses the ambient temperature of the surroundings at which the airframe vapor cycle refrigeration system 10 is operating. A sensor with the letter "P" in a square box senses the pressure of the refrigerant entering the inlet to the compressor and a sensor with the letter "T2" in a square box senses the temperature of the refrigerant entering the inlet to the compressor. The sensors of the refrigerant entering the inlet to the compressor generate signals used for calculating superheat as described below.

The controller 20 functions to generate the COMPRESSOR ROTOR SPEED CONTROL SIGNAL to control the variation of the rotational speed of the compressor rotor to cause the airframe vapor cycle cooling system 10 to operate within a set range of superheat. As is known, superheat is the difference between the dewpoint of the refrigerant at the point of interest and the actual temperature of the refrigerant at the point of interest. With respect to a compressor, it is desirable to operate the compressor such that the refrigerant vapor at the inlet of the compressor has a superheat within a set range a few degrees above the dewpoint. The superheat at the inlet to the compressor is inversely proportional to the speed of rotation of the compressor rotor. As the calculated superheat increases outside the set range, the speed of the rotor of the compressor is caused to increase by the motor speed control to lower the superheat and as the calculated superheat decreases outside the set range, the speed of the rotor is caused to decrease by the motor speed control to increase the superheat. Operation at or below the dewpoint temperature at the inlet to the compressor 12 can cause severe system damage. The controller calculates the superheat of the refrigerant at the output of the evaporator 24 as a function of the sensed temperature and pressure of the refrigerant at the evaporator. U.S. patent application Ser. No. 503,753, entitled "A Refrigerant Superheat Calculator" filed on Apr. 3, 1990, discloses a suitable superheat calculator which may be used within the controller 20. Alternatively, known superheat calculators may be used. The controller 20 generates the COMPRESSOR ROTOR SPEED CONTROL SIGNAL to cause the rotor of the compressor 12 to speed up or slow down to maintain the operation of the compressor such that the refrigerant at the inlet of the compressor has a superheat within a range of 10°-15° F. The controller 20 also produces the FAN SPEED CONTROL SIGNAL which assumes two levels as described above which respectively command the fan 18 to operate at the lower speed or the higher speed. The motor utilized in the fan and the electronic control for the motor are greatly simplified, weigh less and are smaller in size when two operational speeds are utilized for the fan instead of a continuously variable speed control. It should be understood that the invention may be practiced with any two-speed fan and motor control with the two-speed motor and fan control not being part of the present invention. The FAN SPEED CONTROL SIGNAL is generated in accordance with a set of conditions as described below with respect to FIG. 2.

FIG. 2 illustrates a set of conditions for operating the two-speed fan 18 of FIG. 1 in accordance with an embodiment of the present invention to be utilized in an airframe vapor cycle cooling system. It should be understood that the numerical values illustrated in FIG. 2 are only exemplary of an embodiment of the invention with the invention not being limited thereto. The data contained within FIG. 2 is based upon the aforementioned 50-50 mole ratio of R-11 and R-12 refrigerants. The legend "HIGH SPEED" in FIG. 2 refers to a higher speed of operation of the fan 18 and the legend "LOW SPEED" refers to a lower speed of operation with it being understood that the present invention is not limited to applications in which only two speeds of the condenser fan are possible. The set of conditions illustrated in FIG. 2 is a function of the sensed temperatures of the evaporator 24, ambient surroundings and the altitude of operation of the airframe vapor cycle cooling system of FIG. 1.

A first set of conditions for operation of the fan 18 is illustrated in area 50. The fan speed is maintained at the higher speed in area 50 by the generation of a high level fan speed control signal by the controller 20. The area 50 is bounded by a set altitude 52 which, as illustrated, is 1500 feet but it should be understood that the invention is not limited thereto and by a linear control temperature load line 54 which varies inversely with the sensed altitude. The fan 18 operates at the higher speed within the first area 50 when the sensed altitude is above altitude limit 52 independent of evaporator temperature and the sensed ambient temperature is not less than a calculated control temperature calculated from the linear control temperature load line 54 for the sensed altitude at which the airframe vapor cycle cooling system 10 is operating.

A second set of conditions of operation of the fan 18 is illustrated in area 60. The fan speed is maintained at a lower speed within area 60. Area 60 is bounded by the altitude limit 52 and by the linear control temperature load line. The fan 18 is caused to operate by the controller 20 at the lower speed independent of evaporator temperature when the sensed altitude is below the level set by line 52 and the sensed ambient temperature is not greater than a calculated control temperature calculated from the linear control temperature load line 54 for the sensed altitude.

A third set of conditions of operation of the fan 18 is illustrated in area 70. When the airframe vapor cycle cooling system 10 is operating within the third area 70, the fan speed may be operated at either the higher or the lower speed as a function of the sensed evaporator temperature. The third area 70 is bounded by the altitude limit 52 and the linear control temperature load line 54. The fan is caused to operate by the controller 20 at the higher speed when the sensed altitude is above a set level and a sensed evaporator temperature is less than a set temperature and the sensed ambient temperature is not greater than a calculated control temperature determined by the linear control temperature load line 54 for the sensed altitude and the fan is caused to operate by the controller at the lower speed when the sensed altitude is above the altitude limit 52 and a sensed evaporator temperature is greater than a set temperature and the sensed ambient temperature is not greater than a calculated control temperature for the sensed altitude which varies as a function of altitude.

A fourth set of conditions of operation of the fan 18 is illustrated in area 80. When the airframe vapor cycle cooling system 10 is operating in the fourth area 80, the fan speed may be operated at either the higher speed or the lower speed as a function of the sensed evaporator temperature. The fourth area 80 is bounded by the altitude limit 52 and the linear control temperature load line 54. The fan 18 is caused to operate by the controller 20 at the higher speed when the sensed altitude is below the altitude limit 52 and a sensed evaporator temperature is less a set temperature and the sensed ambient temperature is not less than a calculated control temperature calculated from the linear control temperature load line for the sensed altitude; and the fan is caused to operate by the controller at the lower speed when the sensed altitude is below a set level and a sensed evaporator temperature is greater than a set temperature and the sensed ambient temperature is not less than a calculated control temperature determined from the linear control temperature load line 54 for the sensed altitude.

The control provided by the controller 20 of the speed of rotation of the compressor 12 produces system operation within a calculated superheat set range at the inlet of the compressor slightly above the dewpoint and the control of the speed of rotation of fan 18 with a higher and lower speed as a function of sensed altitude, evaporator temperature and ambient temperature produces an energy efficient operation. This system operation minimizes energy consumption by the speed control for the compressor rotor 12 and the speed control of the condenser fan 18 which are the major consumers of energy in a vapor cycle cooling system. The invention further provides for reduced weight and size, lessened expense and a high operational efficiency of a vapor cycle cooling system located on an airframe.

A method of operating the vapor cycle cooling system 10 with fan 18 having at least two controllable speeds for blowing a fluid 16 in contact with condenser 14 to remove heat from compressed refrigerant within the condenser to cause the refrigerant to liquify in accordance with the invention includes sensing an evaporator temperature; sensing an ambient temperature; sensing an altitude at which the vapor cycle cooling system is operating; and controlling the two speeds of the fan as a function of the sensed temperatures and altitudes. The controlling of the two speeds of the fan causes the fan to operate at a lower and a higher speed in accordance with a set of conditions. The set of conditions correspond to operation within the areas 50, 60, 70 and 80 as described above with respect to FIG. 2. Furthermore, the rotational velocity of the rotor of the compressor 12 is controlled as a function of the sensed temperature and a pressure of the refrigerant at the inlet to the compressor to provide operation of the vapor cooling system within a set superheat range.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A vapor cycle cooling system comprising:
   a compressor for compressing refrigerant vapor;
   a condenser receiving compressed refrigerant vapor from the compressor;
   a fan having at least two controllable speeds for blowing a fluid in contact with the condenser to remove heat from the compressed refrigerant at the condenser to cause the refrigerant vapor to liquify, the speeds of the fan being controlled by a control signal;
   an expansion valve receiving liquid refrigerant from the condenser which expands the liquid refrigerant;
   an evaporator receiving the expanded refrigerant which exchanges heat with a fluid stream coupled to a heat load; and
   a controller for generating the control signal, responsive to a sensed evaporator temperature, a sensed ambient temperature and a sensed altitude, which controls two speeds of the fan as a function of the sensed temperatures and altitude by generating the control signal.

2. A vapor cycle cooling system in accordance with claim 1 wherein:
   the controller causes the fan to operate at a lower and a higher speed in accordance with a set of conditions.

3. A vapor cycle cooling system in accordance with claim 2. wherein:
   the fan is caused to operate by the controller at the lower speed independent of evaporator temperature when the sensed altitude is below a set level and the sensed ambient temperature is not greater than a calculated control temperature for the sensed altitude which varies as a function of altitude.

4. A vapor cycle cooling system in accordance with claim 3 wherein:
   the calculated control temperature varies as a linear function of altitude.

5. A vapor cycle cooling system in accordance with claim 2 wherein:
   the fan is caused to operate by the controller at the higher speed independent of evaporator temperature when the sensed altitude is above a set level and the sensed ambient temperature is not less than a calculated control temperature for the sensed altitude which varies as a function of altitude.

6. A vapor cycle cooling system in accordance with claim 5 wherein:
   the calculated control temperature varies as a linear function of altitude.

7. A vapor cycle cooling system in accordance with claim 2 wherein:
   the fan is caused to operate by the controller at the higher speed when the sensed altitude is above a set level and a sensed evaporator temperature is less than a set temperature and the sensed ambient temperature is not greater than a calculated control temperature for the sensed altitude which varies as a function of altitude; and
   the fan is caused to operate by the controller at the lower speed when the sensed altitude is above a set level and a sensed evaporator temperature is greater than a set temperature and the sensed ambient temperature is not greater than a calculated control temperature for the sensed altitude which varies as a function of altitude.

8. A vapor cycle cooling system in accordance with claim 7 wherein:
   the calculated control temperature varies as a linear function of altitude.

9. A vapor cycle cooling system in accordance with claim 2 wherein:
   the fan is caused to operate by the controller at the higher speed when the sensed altitude is below a set level and a sensed evaporator temperature is less than a set temperature and the sensed ambient temperature is not less than a calculated control temperature for the sensed altitude which varies as a function of altitude; and
   the fan is caused to operate by the controller at the lower speed when the sensed altitude is below a set level and a sensed evaporator temperature is greater than a set temperature and the sensed ambient temperature is not less than a calculated control temperature for the sensed altitude which varies as a function of altitude.

10. A vapor cycle cooling system in accordance with claim 9 wherein:
    the calculated control temperature varies as a linear function of altitude.

11. A vapor cycle cooling system in accordance with claim 1 wherein:
    the controller controls a rotational velocity of a compressor rotor, in response to the sensed temperature and a sensed pressure at the inlet to the compressor, to provide operation of the vapor cycle cooling system within a set superheat range.

12. A vapor cycle cooling system in accordance with claim 2 wherein:
    the controller controls a rotational velocity of a compressor rotor, in response to the sensed temperature and a sensed pressure at the inlet to the compressor, to provide operation of the vapor cycle cooling system within a set superheat range.

13. A vapor cycle cooling system in accordance with claim 3 wherein:
    the controller controls a rotational velocity of a compressor rotor, in response to the sensed temperature and a sensed pressure at the inlet to the compressor, to provide operation of the vapor cycle cooling system within a set superheat range.

14. A vapor cycle cooling system in accordance with claim 4 wherein:
    the controller controls a rotational velocity of a compressor rotor, in response to the sensed temperature and a sensed pressure at the inlet to the compressor, to provide operation of the vapor cycle cooling system within a set superheat range.

15. A vapor cycle cooling system in accordance with claim 5 wherein:
the controller controls a rotational velocity of a compressor rotor, in response to the sensed temperature and a sensed pressure at the inlet to the compressor, to provide operation of the vapor cycle cooling system within a set superheat range.

16. A vapor cycle cooling system in accordance with claim 6 wherein:
the controller controls a rotational velocity of a compressor rotor, in response to the sensed temperature and a sensed pressure at the inlet to the compressor, to provide operation of the vapor cycle cooling system within a set superheat range.

17. A vapor cycle cooling system in accordance with claim 7 wherein:
the controller controls a rotational velocity of a compressor rotor, in response to the sensed temperature and a sensed pressure at the inlet to the compressor, to provide operation of the vapor cycle cooling system within a set superheat range.

18. A vapor cycle cooling system in accordance with claim 8 wherein:
the controller controls a rotational velocity of a compressor rotor, in response to the sensed temperature and a sensed pressure at the inlet to the compressor, to provide operation of the vapor cycle cooling system within a set superheat range.

19. A vapor cycle cooling system in accordance with claim 9 wherein:
the controller controls a rotational velocity of a compressor rotor, in response to the sensed temperature and a sensed pressure at the inlet to the compressor, to provide operation of the vapor cycle cooling system within a set superheat range.

20. A vapor cycle cooling system in accordance with claim 10 wherein:
the controller controls a rotational velocity of a compressor rotor, in response to the sensed temperature and a sensed pressure at the inlet to the compressor, to provide operation of the vapor cycle cooling system within a set superheat range.

21. A method of operating a vapor cycle cooling system having a fan with at least two controllable speeds for blowing a fluid in contact with a condenser to remove heat from compressed refrigerant within the condenser to cause the refrigerant to liquify comprising:
sensing an evaporator temperature;
sensing an ambient temperature;
sensing an altitude at which the vapor cycle cooling system is operating; and
controlling the two speeds of the fan as a function of the sensed temperatures and altitude.

22. A method in accordance with claim 21 wherein:
the controlling of the two speeds of the fan causes the fan to operate at a lower and a higher speed in accordance with a set of conditions.

23. A method in accordance with claim 22 wherein:
the fan is caused to operate by the controller at the lower speed independent of evaporator temperature when the sensed altitude is below a set level and the sensed ambient temperature is not greater than a calculated control temperature for the sensed altitude which varies as a function of altitude.

24. A method in accordance with claim 23 wherein:
the calculated control temperature varies as a linear function of altitude.

25. A method in accordance with claim 23 wherein:
the fan is caused to operate by the controller at the higher speed independent of evaporator temperature when the sensed altitude is above a set level and the sensed ambient temperature is not less than a calculated control temperature for the sensed altitude which varies as a function of altitude.

26. A method in accordance with claim 25 wherein:
the calculated control temperature varies as a linear function of altitude.

27. A method in accordance with claim 23 wherein:
the fan is caused to operate by the controller at the higher speed when the sensed altitude is above a set level and a sensed evaporator temperature is less than a set temperature and the sensed ambient temperature is not greater than a calculated control temperature for the sensed altitude which varies as a function of altitude; and
the fan is caused to operate by the controller at the lower speed when the sensed altitude is above a set level and a sensed evaporator temperature is greater than a set temperature and the sensed ambient temperature is not greater than a calculated control temperature for the sensed altitude which varies as a function of altitude.

28. A method in accordance with claim 27 wherein:
the calculated control temperature varies as a linear function of altitude.

29. A method in accordance with claim 23 wherein:
the fan is caused to operate by the controller at the higher speed when the sensed altitude is below a set level and a sensed evaporator temperature is less than a set temperature and the sensed ambient temperature is not less than a calculated control temperature for the sensed altitude which varies as a function of altitude; and
the fan is caused to operate by the controller at the lower speed when the sensed altitude is below a set level and a sensed evaporator temperature is greater than a set temperature and the sensed ambient temperature is not less than a calculated control temperature for the sensed altitude which varies as a function of altitude.

30. A method in accordance with claim 29 wherein:
the calculated control temperature varies as a linear function of altitude.

31. A method in accordance with claim 21 further comprising:
controlling a rotational velocity of a compressor rotor as a function of the sensed temperature and a sensed pressure of refrigerant flowing to an inlet of the compressor to provide operation of the vapor cooling system within a set superheat range.

32. A method in accordance with claim 22 further comprising:
controlling a rotational velocity of a compressor rotor as a function of the sensed temperature and a sensed pressure of refrigerant flowing to an inlet of the compressor to provide operation of the vapor cooling system within a set superheat range.

33. A method in accordance with claim 23 further comprising:
controlling a rotational velocity of a compressor rotor as a function of the sensed temperature and a sensed pressure of refrigerant flowing to an inlet of the compressor to provide operation of the vapor cooling system within a set superheat range.

34. A method in accordance with claim 24 further comprising:
controlling a rotational velocity of a compressor rotor as a function of the sensed temperature and a sensed pressure of refrigerant flowing to an inlet of the compressor to provide operation of the vapor cooling system within a set superheat range.

35. A method in accordance with claim 25 further comprising:
controlling a rotational velocity of a compressor rotor as a function of the sensed temperature and a sensed pressure of refrigerant flowing to an inlet of the compressor to provide operation of the vapor cooling system within a set superheat range.

36. A method in accordance with claim 26 further comprising:
controlling a rotational velocity of a compressor rotor as a function of the sensed temperature and a sensed pressure of refrigerant flowing to an inlet of the compressor to provide operation of the vapor cooling system within a set superheat range.

37. A method in accordance with claim 27 further comprising:
controlling a rotational velocity of a compressor rotor as a function of the sensed temperature and a sensed pressure of refrigerant flowing to an inlet of the compressor to provide operation of the vapor cooling system within a set superheat range.

38. A method in accordance with claim 28 further comprising:
controlling a rotational velocity of a compressor rotor as a function of the sensed temperature and a sensed pressure of refrigerant flowing to an inlet of the compressor to provide operation of the vapor cooling system within a set superheat range.

39. A method in accordance with claim 29 further comprising:
controlling a rotational velocity of a compressor rotor as a function of the sensed temperature and a sensed pressure of refrigerant flowing to an inlet of the compressor to provide operation of the vapor cooling system within a set superheat range.

40. A method in accordance with claim 30 further comprising:
controlling a rotational velocity of a compressor rotor as a function of the sensed temperature and a sensed pressure of refrigerant flowing to an inlet of the compressor to provide operation of the vapor cooling system within a set superheat range.

* * * * *